United States Patent

[11] 3,588,076

| [72] | Inventor | Robert L. Ammerman<br>La Mirada, Calif. |
|---|---|---|
| [21] | Appl. No. | 786,550 |
| [22] | Filed | Dec. 20, 1968 |
| [45] | Patented | June 28, 1971 |
| [73] | Assignee | North American Rockwell Corporation |

[54] VARIABLE-ORIFICE DEVICE
9 Claims, 4 Drawing Figs.

[52] U.S. Cl. .................................................. 267/127,
267/34, 267/65
[51] Int. Cl. .................................................. F16f 5/00
[50] Field of Search ........................................ 267/113,
114, 121, 123, 137, 34, 65

[56] References Cited
UNITED STATES PATENTS
3,007,496  11/1961  Heiss .......................... 267/65(D)
3,491,993  1/1970  Scholin et al. ................. 267/34

*Primary Examiner*—James B. Marbert
*Attorneys*—William R. Lane, Allan Rothenberg and Sidney Magnes ABSTRACT: A shock absorber, formed with a valve having a variable size orifice whose size is controlled and directly related to the pressure of a pressurized fluid. The size of the orifice is varied by the fluid moving a multiapertured member relative to an aperture-covering member so that the number of apertures uncovered increases with pressure. The pressurized fluid discharges, through the uncovered apertures, into a sump. Thus is provided a shock absorber that provides very rapid motion at the initiation of a shock which motion diminishes at a more rapid rate than the rate that the shock diminishes.

PATENTED JUN28 1971

INVENTOR
ROBERT L. AMMERMAN

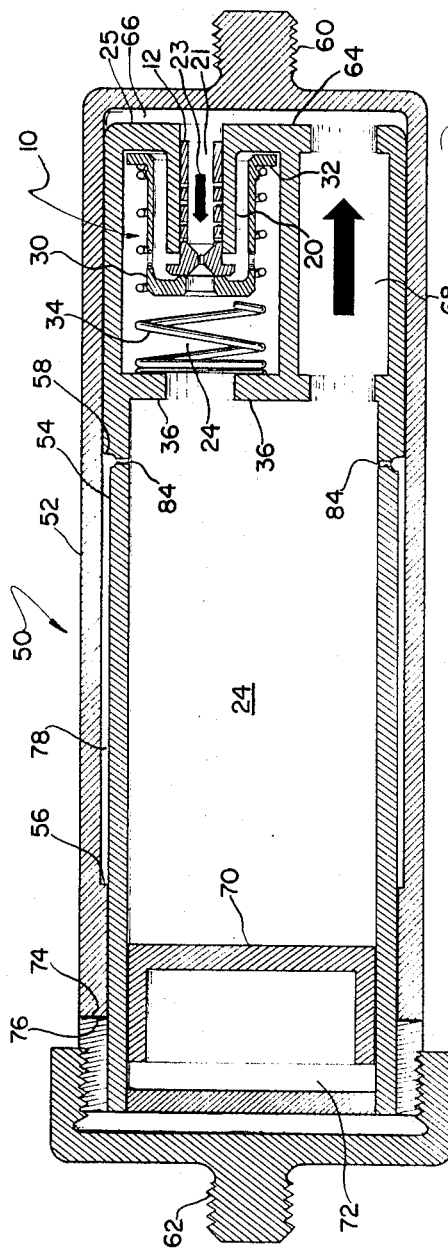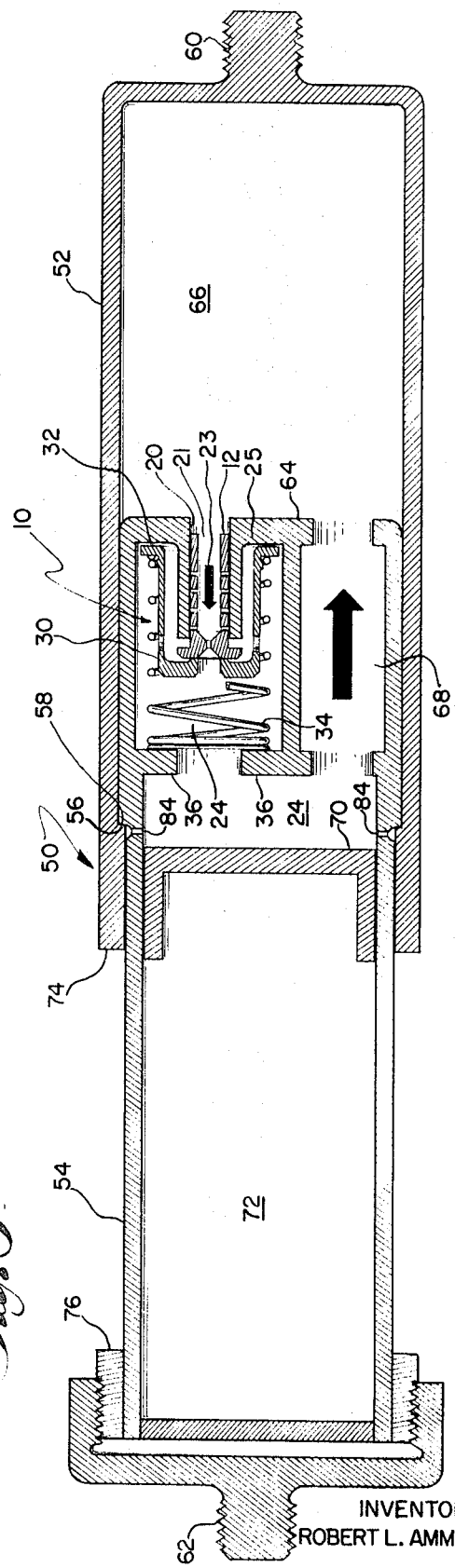

3,588,076

VARIABLE-ORIFICE DEVICE

The invention described herein was made in the performance of work under a NASA contract; and is subject to the provisions of the National Aeronautics and Space Act of 1958, Public Law 85-568 (72 Stat. 426; 42 U.S.C. 2451) as amended.

BACKGROUND

It is well known that shock-absorbers are widely used; being useful in automobiles, in the landing-gear of aircraft, in snubbers for railroad cars, in space-vehicles to simplify docking, and in many other applications. In shock-absorbing operations, one body generally approaches another at a fairly high velocity; and if no shock-absorber were used, the two bodies would crush each other and/or bounce apart. The shock-absorber permits the bodies to impact safely; and then, by absorbing energy, prevents them from bouncing apart.

Shock-absorbers generally use a valve wherein a hydraulic fluid is forced through apertures, so that the shock-absorber provides a "cushioning" action. As part of their operative arrangements, prior-art shock-absorbers generally contained a mechanical linkage, arm, rod, or the like that positioned one portion of the valve relative to another.

For example, in some prior-art shock-absorbers, movement of the mechanical linkage caused a plurality of apertures to align themselves with other apertures to control the flow of the hydraulic fluid; and it may be understood that extremely high-precision manufacturing processes are necessary to assure that the apertures become precisely aligned. In other type of prior-art shock-absorber, the mechanical linkage activated a valve wherein the variable cross section of a wedge-shaped slot changed area to control the flow of hydraulic fluid. In order to assure fine-control, the slot had to be very gradually angled, and this design required a long mechanical movement; alternatively, the slot could be sharply angled to use a short mechanical movement—but this sharp-angle degraded the control. Still another type of prior-art valve positioned a cone in a circular opening, to control fluid flow; but in this case any eccentricity caused disproportionately high fluid-flow; and thus loss of control.

In the above cases, as the impact conditions changed, the orifice—or aperture (s)—through which the hydraulic fluid flowed was varied by a mechanical movement; and this gave rise to the term "mechanically variable orifice valve."

In shock-absorber action, it is essential to precisely control the flow of the pressurized fluid; if the flow should be too slow, the shock-absorber is "hard"—and the structure and/or passengers are exposed to the shock; if, on the other hand, the fluid-flow is too fast, the shock-absorber is too "soft," and it will bottom-out—thus transmitting the shock to the structure. In general, the shock-absorber should start in its soft-state, and should change to its hard-state; the states and the transition being controlled by the fluid-flow.

It therefore becomes apparent that the prior-art aperture-alignment, tapered-slots, coned openings, and mechanical-linkages, had to be precisely made; and, even then, did not—at times—provide the computed and desired fluid-flow. Moreover, it became quite expensive to mass-produce these devices, due to the high-tolerances required for satisfactory operation.

OBJECTS AND DRAWINGS

It therefore is an object of the present invention to provide an improved valve for use in devices such as shock-absorbers.

The attainment of this object, and others, will be realized in the following detailed specification; taken in conjunction with the drawings of which FIG. 1 shows a cross-sectional view of a pressure-controlled variable-orifice valve;

FIG. 3 shows a shock-absorber in its extended state; and

FIG. 4 shows a shock-absorber in its compacted state.

SYNOPSIS

Broadly speaking, the present invention uses a valve having a variable-area orifice comprising a pattern of small, preferably circular, apertures. The valve movement is produced—rather than by a mechanical linkage—by a pressurized fluid that causes a progressive covering/uncovering of apertures of the pattern; the instantaneous number of uncovered apertures producing an "exiting-port" that permits the controlled escape of pressurized fluid. The particular size, arrangement, and positioning of the apertures produces a variable orifice whose instantaneous area can be controlled to produce the desired shock-absorber cushioning action.

It will be noted from the following discussion that the aperture-size and the aperture-pattern are not extremely critical; so that the disclosed device can be produced cheaply; and yet provide a shock-absorber that is more precise and has better reproducibility than prior-art devices.

DESCRIPTION

Figure 1:
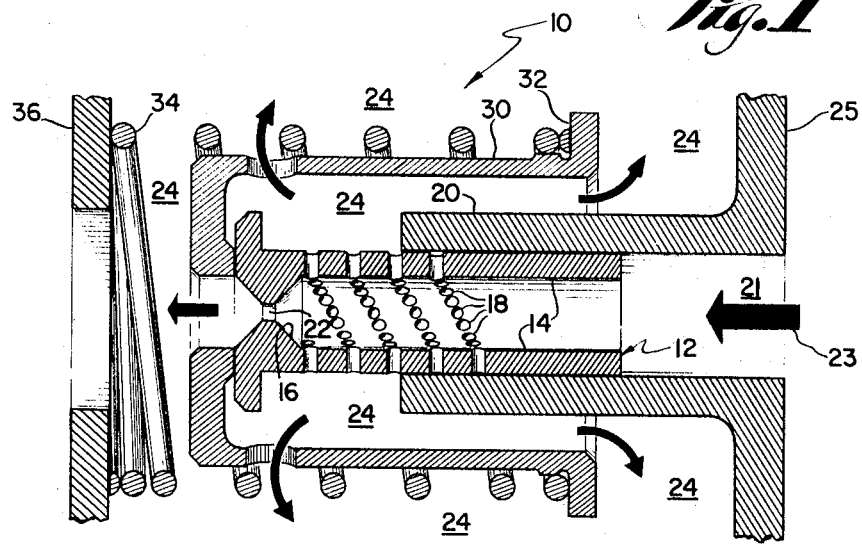

FIG. 1 shows a cross-sectional view of a variable-orifice valve 10 that comprises a hollow spool 12 having a sidewall 14 and an end wall 16. The sidewall 14 contains a pattern of apertures 18 that will be discussed later; and end wall 16 contains an additional aperture 22.

Spool 12, generally a cylinder, is shown as fitted into an imperforate mating sleeve 20 whose inside diameter is slightly larger than the outside diameter of the spool; sleeve 20 having a flange-portion 25. This arrangement permits relative longitudinal coaxial motion between spool 10 and sleeve 20 with little or no fluid flow between them along the mating surface. (Seals have been omitted for clarity.) Normally the valve is in its "closed" state wherein spool 12 is in its "rightmost" position (not illustrated) and contained within sleeve 20; the sidewall apertures 18 being covered by the sidewall of the imperforate sleeve 20.

In operation, from the closed-valve position, pressurized fluid resulting from the impact (to be more particularly described below) appears in channel 21; and flows, as indicated, by arrow 23, into the central portion of hollow spool 12. A predetermined volume of the pressurized fluid tends to be discharged through the always-uncovered aperture 22 into a sump-volume 24.

As the pressure increases, say due to a high-magnitude shock, the pressurized fluid acts upon end wall 16, and "opens" the valve by moving the spool 10 to the extreme leftmost position, in a "forward" direction. This forward (leftward) movement uncovers all of the apertures 18; and the pressurized fluid thereupon gushes through the now-uncovered apertures, into the sump-volume 24. It should be noted that the low-volume fluid-flow through aperture 22 and the high-volume fluid-flow through all the apertures does not appreciably slow down the impacting bodies; so that the shock-absorber "gives" in a soft-state manner.

The fluid-flow through the now-uncovered apertures reduces both the volume and the pressure of the pressurized-fluid in chamber 21, as will be described in more detail below.

As indicated above, it is ordinarily desirable for a shock-absorber to initially be soft; and to further enhance this effect, aperture 22 and the first few apertures 18 to be uncovered can be made fairly large. According to the design of the shock-absorber, it should then become progressively stiffer, in order to absorb more impact-energy, and to prevent "bottoming;" and this result is achieved as follows.

As the pressure of the pressurized-fluid in chamber 21 decreases, due—in part—to fluid-flow through the apertures 18 into sump-volume 24, spool 12 now moves rightward under the influence of biasing means—such as spring 34—to partially "close" the valve. As a result of this rearward movement, some of the apertures 18 are now covered by the imperforate sleeve 20. The now-reduced number of uncovered apertures thus produces a reduced-area exit-port for the escape of the pressurized-fluid. Due to the fewer apertures for fluid flow, the shock absorber now acts in a hard-state manner; and absorbs more impact energy.

ONce the pressurized fluid has been discharged through the various apertures into sump-volume 24, the now-unpressurized fluid in sump-volume 24 is then free to escape into the rest of the system—to be either reused or discharged. It should be noted that in some cases the pressurized-fluid may be a gas.

Thus, a variable-orifice device is produced by the pressure, rather than by a mechanical linkage; and the actual spool-movement can be quite small.

It is advantageous to make a shock-absorber reusable and/or useful for a series of impacts. Biasing means 34 accomplishes this by causing spool 10 to move rearwardly (to the right) each time that the pressure decreases.

A perforated shell 30 is affixed to, and moves with, spool 10; shell 30 having a spring-attachment portion such as an annular lip 32. One end of a coil spring 34 (shown as a compression type) bears upon lip 32 in such a direction as to "close" the valve; the other end of spring 34 bearing upon a flange 36. Thus, each time that the fluid-pressure is reduced to a valve below the force excited by spring 34, the spring's action imparts a rightward movement to the spool/shell assembly; thus covering the certain apertures, and decreasing the exit-port area.

The spring, in addition to closing the valve, also enters into its operation. For example, the spring establishes the pressure at which the valve starts to open, and also controls the rate at which the valve opens and closes—before opening time, the always-open aperture 22 providing a soft shock-absorber action. Thus, the operation may be modified by the spring-constants, as well as by the spool-diameter and stroke.

Figure 2:
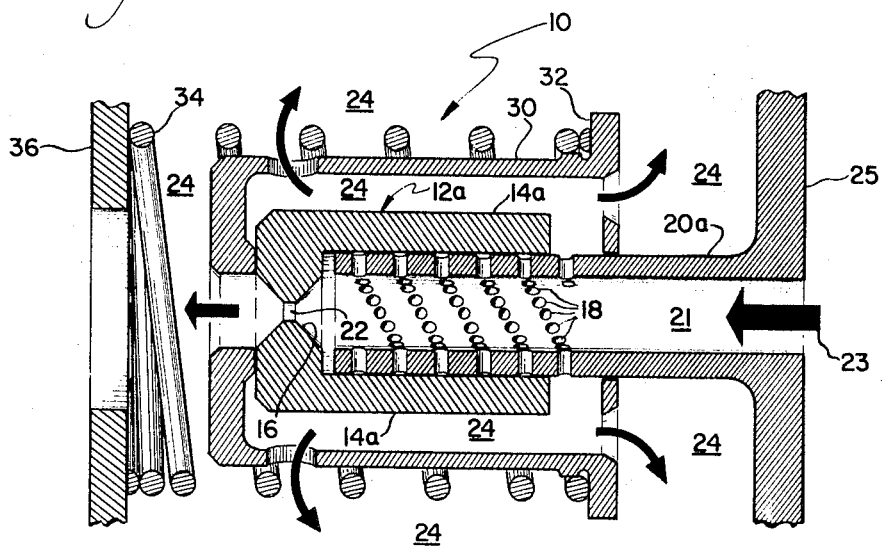
FIG. 2 shows another embodiment.

Whereas the foregoing discussion related to a perforated spool 12 positioned either within or external to an imporforate sleeve 20, FIG. 2 shows an imperforate spool 12a positioned external to (although, alternatively, it may be positioned inside of) an apertured sleeve 20a. In this arrangement the pressurized fluid is introduced into channel 21, as indicated by arrow 23; a predetermined volume thereof being discharged through aperture 22 into sump-volume 24. As the pressure increases, the pressurized-fluid acts upon end wall 16; and opens the valve by moving spool 12a to the left in the forward direction. This forward movement causes the imperforate sidewalls 14a to uncover apertures 18 of sleeve 20a, and the pressurized-fluid thereupon discharges through the progressively more numerous apertures into the sump-volume.

The subsequent operation is as discussed above.

It will be noted that the actual size of the apertures is not critical; their actual shape is not critical; their actual locations are not critical; and the aperture-pattern is not critical—each of these factors coacting with the others to produce the desired overall result.

If desired, the subsequent apertures may be larger, progressively larger, smaller, or of the same size of the earlier apertures; in this way producing a hardness/softness curve to fit the desired conditions.

Thus, while the orifice, or exit-port varies, the orifice-area differences for sequential valve positions may be the same, may become larger, or may become smaller—depending upon the size, number, and pattern of apertures. The aperture-pattern for apertures 18 is preferably arranged in such a way that new apertures are continuously being covered or uncovered; a longitudinal-overlapping pattern arrangement, such as a helical aperture-pattern, producing an extremely smooth-curved shock-absorber action.

It should be noted that—since no alignment of apertures, slots, channels, etc. is necessary—spool 12a may even rotate without disabling the valve. Moreover, drilling holes in one of the easiest and most-precise of manufacturing procedures; so that producing the desired apertures does not offer any appreciable manufacturing problem—and the disclosed device is therefore readily mass-produced. Moreover, the use of round holes permits more predictable and consistent results that come close to computed requirements.

One model of such a valve was quite miniaturized, having a stroke of about one-fourth inch, a length of about five-eighth inch, an outer diameter of about one-fourth inch, and used a fluid pressurized to 1,400 (p.s.i.); producing a shock-absorber that became progressively stiffer in a smooth continuous manner. Such a miniaturized valve also has application to an automobile bumper-shock-absorber.

With the above explanation of the variable-orifice valve in mind, attention is now directed to FIGS. 3 and 4; these showing two states—extended and contracted, respectively—of a shock absorber using the disclosed valve 10.

In FIG. 3, shock-absorber 50 comprises an outer housing-portion 52 and an inner housing-portion 54; these being illustrated as (but not necessary restricted to) a telescopic arrangement. As indicated, the overall extension may be limited by means such as abutting shoulders 56 and 58 on housing-portions 52 and 54 respectively; and suitable endpieces 60 and 62 may be threaded, etc. in order to provide attachments.

The inner housing-portion 54 terminates in an end wall 64 that cooperates with housing 52 to form a "high-pressure" chamber 66. End wall 64 is "fluid-permeable;" and comprises (A) one or more one-way bypass valves 68 that are oriented to pass fluid from sump-volume 24 to high-pressure chamber 66, and also comprises (B) a previously described variable-orifice valve 10 oriented to pass fluid from high-pressure chamber 66 through channel 21 to low-pressure sump-volume 24. As indicated in FIG. 3 (and in FIG. 4), valve 10 is associated with sleeve/flange 20/25 and with spring-flange 36, as previously described in FIGS. 1 and 2.

In the extended state of FIG. 3, the shock-absorber is ready for operation; and an impact drives the two housing-portions toward each other in a telescoping movement. It will be realized that the impact tends to reduce the volume of the high-pressure chamber 66, and to compress the fluid therein to a high pressure, say 1,400 (p.s.i.). This now-pressurized fluid is discharged through the apertures of the variable-orifice valve 10, into sump-volume 24, at a low pressure of say 30 p.s.i.—as previously discussed.

FIG. 3 shows a biassing-piston 70 (to be discussed more fully later) that is mounted for axial movement in the inner housing; and as the amount of now-unpressurized fluid accumulates in sump-volume 24, the fluid causes piston 70 to slide to the left—thus enlarging the low-pressure sump chamber to accommodate the increasing amount of unpressurized fluid.

It has been found convenient to introduce a volume of gas into the space 72 on the left (distal) side of piston 70, in order to control the piston-movement—although a spring or other biasing means may be used. In any case, piston 70 at first moves easily; and then as space 72 decreases, and the confined gas is further compressed, moves less easily—but at no time does its resistance approach anywhere near the 1,400 p.s.i. pressure of the pressurized fluid in the high-pressure chamber.

Thus, the impact causes the fluid to flow through variable-orifice valve 10 in a controlled shock-absorbing manner; the final contracted-state of the shock-absorber being shown in FIG. 4. Abutting shoulders 74 and 76 of housing-portions 52 and 54 may be used to limit contraction.

As indicated in FIG. 4, the impact has been absorbed; and the low-pressure fluid is now in sump-volume 24, being under a low bias-pressure of say 150 p.s.i. produced by piston 70 and the now-compressed gas in space 72. Variable-orifice valve 10 is in its closed position as discussed previously, so that the fluid cannot leak through it into chamber 66—except for the small quantity that flows through aperture 22.

As the shock-absorber 50 relaxes after impact, it resumes its extended-state (FIG. 3) either (A) by the use of external springs, or (B) by the action of the now-compressed gas in space 72. To understand this later action, it should be recalled that the gas in space 72 is now under a pressure of about 150 p.s.i.; so that piston 70 transmits this biassing pressure to the fluid in sump-volume 24. Whereas this low-pressure fluid in chamber 24 cannot escape through valve 10, it can readily pass through the one-way it moves the outer housing-portion 52 to the right. Thus, the shock-absorber eventually returns to its extended-state of FIG. 3.

It should be noted that if the shock-absorber is in a partially extended state, and should receive an impact, it would start its operation in a soft-state manner—due to the operation of the disclosed valve 10; and the state would gradually harden, as discussed above.

Referring back to FIG. 4, it is desirable to vent low-pressure fluid to chamber 78 between shoulders 56 and 58, in order to nullify the vacuum produced there during compaction; apertures 84 in housing 54 being provided for this purpose.

I claim:

1. A pressure-variable orifice valve comprising:
a sleeve member;
a hollow-spool member, said spool member having one substantially closed end;
a pattern of apertures perforating the side wall of one of said members;
said hollow-spool member being slidably mounted within said sleeve member—whereby in a closed position of said spool and sleeve members said apertures of said one member are covered by the other member, and whereby axially slidable relative motion of said members progressively covers or uncovers selected one of said apertures;
means for applying a pressurized fluid to said spool member for producing said relative motion for uncovering selected apertures and varying the size of the exit porting for controlling the discharge of said pressurized fluid;
a sump volume,
means for discharging the pressurized fluid through said uncovered apertures into said sump volume; and
said aperture pattern comprising a plurality of progressively smaller-sized apertures positioned in longitudinal overlapping relation for producing progressively different exit-porting area differences with axial movement.

2. A pressure-variable orifice comprising:
an imperforate sleeve having a given internal dimension;
a hollow-spool having an external dimension slightly smaller than said internal dimension, said spool having one substantially closed end;
a pattern of apertures perforating the side wall of said spool, said aperture-pattern comprising a plurality of progressively smaller sized apertures positioned in longitudinal-overlapping relation;
means for positioning said spool within said sleeve for causing said spool to have coaxially slidable motion relative to said sleeve—whereby the normal closed-position of said spool relative to said sleeve covers said apertures, and a forwardly directed axially slidable motion progressively uncovers selected said apertures;
means for introducing a pressurized-fluid into the interior of said spool, for producing said forwardly directed axial-movement of said spool relative to said sleeve, said forwardly directed movement progressively uncovering selected apertures, and increasing the size of the exit-porting, thus controlling the escape of said pressurized-fluid from said spool; and
a sump-volume.

3. A telescopic-type shock-absorber comprising:
an outer housing-portion;
an inner housing-portion, said inner-portion having a fluid-permeable end wall;
means for positioning said inner and outer housing-portions in a telescopic relation for causing said fluid-permeable end wall to form a high-pressure chamber on one side of said end wall, and to form a low-pressure chamber on the other side of said end wall;
said fluid-permeable end wall comprising a variable-orifice-valve oriented to pass a fluid from said high-pressure chamber to said low-pressure chamber, said end wall further comprising a bypass valve oriented to pass said fluid from said low-pressure chamber to said high-pressure chamber;
said variable orifice valve comprising an imperforate sleeve having a given internal dimension, a hollow-spool having an external dimension slightly smaller than said internal dimension—said spool having one substantially closed end, a pattern of apertures perforating the sidewall of said spool—said aperture-pattern comprising a plurality of progressively smaller sized apertures positioned in longitudinal-overlapping relation, means for positioning said spool within said sleeve—whereby the normal closed-position of said spool and sleeve covers said apertures, and an axially motion progressively covers/uncovers selected said apertures, for controlling the size of the exit-port, a lipped perforated shell affixed to said spool, and spring means—comprising a spring bearing on said lip—for producing a rearwardly directed axial-movement of said spool relative to said sleeve, for progressively covering said pattern-apertures as said pressurized-fluid becomes lowered in pressure;
means for causing shock-absorber action to progressively increase the volume of said low-pressure chamber and to progressively reduce the volume of said high-pressure chamber, for pressurizing said fluid in said high-pressure chamber, and causing said pressurized-fluid to flow from said high-pressure chamber through said variable-orifice valve into said low-pressure chamber;
piston means for maintaining a biasing pressure in said low-pressure chamber; and
means at relaxation of said shock-absorber action, for causing said biassing pressure to cause said fluid to flow from said low-pressure chamber through said bypass valve into said high-pressure chamber.

4. A pressure-variable orifice operable by a pressurized fluid, said orifice comprising:
a first member and a second member movable relative to each other,
said first member having an orifice means,
spring means for urging said members to a first position to substantially cover said orifice means when said fluid is at a low pressure, and
means responsive to increases in the pressure in said pressurized fluid to urge said members toward a second position so that orifice means is progressively uncovered to increase the size of the orifice area as the pressure increases to allow said pressurized fluid to pass therethrough.

5. The orifice of claim 4 wherein:
said second member is a sleeve and disposed in a fixed position so that said fluid enters through one end thereof,
said first members is a hollow spool,
said means responsive to said pressure is a substantially closed end on said spool,
said orifice means is a pattern of apertures perforating the sidewall of said hollow spool,
said hollow spool is slidably mounted within said sleeve, and
said spring means urges said spool into said sleeve.

6. The orifice of claim 4 wherein:
said first member is a sleeve and disposed in a fixed position so that said fluid enters through one end thereof,
said second member is a hollow spool that is disposed around said sleeve,
said means responsive to said pressure is a substantially closed end on said spool,
said orifice means is a pattern of apertures perforating the sidewalls of said sleeve,
said hollow spool is slidably mounted with respect to said sleeve, and
said spring means urges said spool around said sleeve.

7. The orifice of claim 5 wherein said aperture pattern comprises a plurality of progressively smaller-sized apertures positioned in longitudinal overlapping relation for producing progressively different exit-porting area differences with axial movement.

8. The orifice of claim 6 wherein said aperture pattern comprises a plurality of progressively smaller-sized apertures positioned in longitudinal overlapping relation for producing progressively different exit-porting area differences with axial movement.

9. A shock absorber comprising:

an outer housing portion;

an inner housing portion having a fluid permeable end wall;

means for positioning said inner and outer housing portions in a relation that causes said fluid permeable end wall to form a high-pressure chamber on one side of said end wall, and to form a low-pressure chamber on the other side of said end wall;

said fluid permeable end wall comprising a variable-orifice valve oriented to pass a fluid from said high-pressure chamber to said low-pressure chamber, said end wall further comprising a bypass valve oriented to pass said fluid from said low-pressure chamber to said high-pressure chamber;

means for causing shock-absorber action to increase the volume of said low-pressure chamber and to reduce the volume of said high-pressure chamber, for pressurizing said fluid in said high-pressure chamber, and causing said pressurized fluid to flow from said high-pressure chamber through said variable-orifice valve into said low-pressure chamber;

means for causing a relaxation of said shock-absorber action to increase the volume of said high-pressure chamber, and to decrease the volume of said low-pressure chamber through said bypass valve into said high-pressure chamber;

said orifice valve comprising:

a first member and a second member movable relative to each other, said first member having an orifice means, spring means for urging said members to a first position to substantially cover said orifice means when said fluid is at a low pressure, and means responsive to increases in the pressure in said pressurized fluid to urge said members toward a second position so that said orifice means is progressively uncovered to increase the size of the orifice area as the pressure increases to allow said pressurized fluid to pass therethrough.

PO-1050
(5/69)

UNITED STATES PATENT OFFICE
CERTIFICATE OF CORRECTION

Patent No. 3,588,076      Dated 6/28/71     (PF68M77)

Inventor(s) Robert L. Ammerman

It is certified that error appears in the above-identified patent and that said Letters Patent are hereby corrected as shown below:

ABSTRACT:    The second paragraph of the ABSTRACT was completely omitted and should be added as follows:

"Suitable size, number and arrangement of the apertures provides a variable-orifice whose exit-port area varies in a predetermined manner to provide the shock-absorber with a selected energy-absorption characteristics."

CLAIM 2:    The following, which was completely omitted, should be added at the end of Claim 2 (Page 2 of Original Claim 7):

"means for discharging the pressurized-fluid from said spool, through said uncovered pattern-apertures, into said sump volume;

a lipped perforated shell affixed to said spool; and spring means -- comprising a spring bearing on said lip -- for producing a rearwardly-directed axial-movement of said spool relative to said sleeve, for progressively covering said pattern-apertures as said pressurized-fluid becomes lowered in pressure."

Signed and sealed this 22nd day of February 1972.

(SEAL)
Attest:

EDWARD M. FLETCHER, JR.       ROBERT GOTTSCHALK
Attesting Officer             Commissioner of Patents